(12) United States Patent
Mochizuki et al.

(10) Patent No.: US 12,506,187 B2
(45) Date of Patent: *Dec. 23, 2025

(54) BATTERY BANK UNIT, REMAINING CHARGE TIME CALCULATION METHOD, AND NON TRANSITORY RECORDING MEDIUM STORING COMPUTER READABLE PROGRAM STORING THEREIN FOR CALCULATING REMAINING CHARGE TIME OF BATTERY BANK UNIT

(71) Applicant: FDK CORPORATION, Tokyo (JP)

(72) Inventors: Shun Mochizuki, Tokyo (JP); Kenji Kitamura, Tokyo (JP); Yasuyuki Katsube, Tokyo (JP)

(73) Assignee: FDK CORPORATION, Tokyo (JP)

(*) Notice: Subject to any disclaimer, the term of this patent is extended or adjusted under 35 U.S.C. 154(b) by 600 days.

This patent is subject to a terminal disclaimer.

(21) Appl. No.: 18/051,617

(22) Filed: Nov. 1, 2022

(65) Prior Publication Data
US 2023/0144462 A1 May 11, 2023

(30) Foreign Application Priority Data
Nov. 5, 2021 (JP) .................. 2021-181218

(51) Int. Cl.
*H02J 7/00* (2006.01)
*G01R 31/36* (2020.01)
(Continued)

(52) U.S. Cl.
CPC ...... *H01M 10/443* (2013.01); *G01R 31/3648* (2013.01); *G01R 31/367* (2019.01);
(Continued)

(58) Field of Classification Search
CPC ............. H01M 10/443; H01M 10/441; H01M 10/482; H01M 10/486; G01R 31/3648;
(Continued)

(56) References Cited

U.S. PATENT DOCUMENTS

| 5,780,991 | A | * | 7/1998 | Brake | ................ | H02J 7/00038 |
| | | | | | | 320/120 |
| 5,808,442 | A | * | 9/1998 | Kaite | ................. | H01M 10/441 |
| | | | | | | 320/148 |

(Continued)

FOREIGN PATENT DOCUMENTS

| CN | 113553534 A | 10/2021 |
| EP | 4086110 A1 | 11/2022 |

(Continued)

OTHER PUBLICATIONS

Extended European Search Report dated Apr. 5, 2023 for the corresponding European Patent Application No. 22205371.2, 8 Pages.

(Continued)

*Primary Examiner* — John T Trischler
(74) *Attorney, Agent, or Firm* — Shih IP Law Group, PLLC

(57) ABSTRACT

A battery bank unit includes: a first battery bank and a second battery bank that are connected in parallel to each other; and a control apparatus that performs collective charge for collectively charging the first battery bank and the second battery bank, performs first bank charge for charging only the first battery bank after the collective charge, and performs second bank charge for charging only the second battery bank after the first bank charge. The control apparatus calculates remaining time to complete charge of the battery bank unit based on a temperature of the battery bank unit at a start of the collective charge.

10 Claims, 8 Drawing Sheets

(51) Int. Cl.
  *G01R 31/367* (2019.01)
  *G01R 31/396* (2019.01)
  *H01M 10/44* (2006.01)
  *H01M 10/48* (2006.01)
  *H01M 50/512* (2021.01)
  *H01M 10/04* (2006.01)
  *H01M 10/42* (2006.01)

(52) U.S. Cl.
  CPC ....... *H01M 10/441* (2013.01); *H01M 10/482* (2013.01); *H01M 10/486* (2013.01); *H02J 7/0013* (2013.01); *H02J 7/0025* (2020.01); *H02J 7/0071* (2020.01); *H02J 7/007182* (2020.01); *H02J 7/007194* (2020.01); *G01R 31/396* (2019.01); *H01M 10/0445* (2013.01); *H01M 2010/4271* (2013.01); *H01M 10/44* (2013.01); *H01M 10/48* (2013.01); *H01M 50/512* (2021.01); *H02J 7/0047* (2013.01); *H02J 7/0048* (2020.01); *H02J 7/0049* (2020.01); *H02J 7/0063* (2013.01)

(58) Field of Classification Search
  CPC .... G01R 31/367; H02J 7/0013; H02J 7/0025; H02J 7/007182; H02J 7/007194
  USPC .................................................. 320/124, 127
  See application file for complete search history.

(56) References Cited

U.S. PATENT DOCUMENTS

| | | | | |
|---|---|---|---|---|
| 6,281,661 B2* | 8/2001 | Kaite | ............... | H02J 7/0019 320/139 |
| 6,307,350 B1* | 10/2001 | Alderman | ............ | H01M 10/46 320/116 |
| 6,346,794 B1* | 2/2002 | Odaohhara | .......... | H02J 7/0025 320/116 |
| 6,777,913 B2* | 8/2004 | You | ............... | H02J 7/0013 320/125 |
| 6,828,759 B1* | 12/2004 | Xiong | ............... | H02J 7/0013 320/116 |
| 7,456,610 B2* | 11/2008 | Yamashita | ............ | H02J 7/04 320/158 |
| 7,638,897 B2* | 12/2009 | Koski | ............... | H02J 1/001 600/300 |
| 8,106,624 B2* | 1/2012 | Hayashi | .......... | H01M 10/482 324/435 |
| 8,106,632 B2* | 1/2012 | Delaille | ............ | H02J 7/0019 320/152 |
| 8,288,995 B2* | 10/2012 | Jimbo | ............ | H02J 7/007182 320/147 |
| 8,339,095 B2* | 12/2012 | Hayashi | .......... | H01M 10/441 320/132 |
| 8,655,524 B2* | 2/2014 | Ichikawa | ............ | B60L 58/20 701/22 |
| 8,660,809 B2* | 2/2014 | Yu | ............... | G01R 31/367 702/63 |
| 8,692,515 B2* | 4/2014 | Nakao | ............ | H02J 7/0016 320/118 |
| 8,710,800 B2* | 4/2014 | Gibbs | ............ | B60L 53/34 320/116 |
| 9,187,000 B2* | 11/2015 | Kuwano | ............ | H02J 7/0019 |
| 9,209,638 B2* | 12/2015 | Bouman | ............ | B60L 53/20 |
| 9,522,607 B2* | 12/2016 | Kim | ............... | B60L 53/62 |
| 9,533,585 B2* | 1/2017 | Murata | ............ | B60W 20/15 |
| 9,559,531 B2* | 1/2017 | Gilbert | ............ | H02J 50/10 |
| 9,627,897 B2* | 4/2017 | Zhang | ............ | G01R 31/387 |
| 9,641,013 B2* | 5/2017 | Lee | ............... | H02J 7/0014 |
| 9,667,079 B2* | 5/2017 | Takano | ............ | H02J 7/0048 |
| 9,711,976 B2* | 7/2017 | Abe | ............... | H01M 10/486 |
| 9,837,834 B2* | 12/2017 | Sugiyama | .......... | H02J 7/00714 |
| 10,069,313 B2* | 9/2018 | Tkachenko | ......... | H01M 10/441 |
| 10,218,188 B2* | 2/2019 | Zhang | ............... | H02J 7/0047 |
| 10,263,435 B2* | 4/2019 | Kim | ............... | H02J 7/0013 |
| 10,286,806 B2* | 5/2019 | Suzuki | ............... | B60L 58/25 |
| 10,297,855 B2* | 5/2019 | Qiao | ............... | H02J 7/0024 |
| 10,404,095 B2* | 9/2019 | Sakamoto | ............ | H02J 9/062 |
| 10,408,884 B2* | 9/2019 | Willey | ............ | B25F 5/00 |
| 10,523,030 B2* | 12/2019 | Ozawa | ............ | H01M 10/443 |
| 10,536,014 B2* | 1/2020 | Sekiguchi | ............ | H02J 7/0049 |
| 10,587,128 B2* | 3/2020 | Zheng | ............ | H02J 7/0013 |
| 10,670,659 B2* | 6/2020 | Kawamura | ........ | G01R 31/3648 |
| 10,817,277 B2 | 10/2020 | Jeong | | |
| 10,951,048 B2* | 3/2021 | Mizoguchi | ............ | H02J 7/0013 |
| 11,143,707 B2* | 10/2021 | Willey | ............ | H02J 7/0047 |
| 11,171,368 B2* | 11/2021 | Hwang | ............ | H01M 50/204 |
| 11,205,905 B2* | 12/2021 | Park | ............... | H01M 10/4207 |
| 11,228,186 B2* | 1/2022 | Kanou | ............ | H01M 10/44 |
| 11,349,144 B2* | 5/2022 | Qiao | ............... | H02J 7/0024 |
| 11,387,660 B2* | 7/2022 | Kanou | ............ | H01M 10/4285 |
| 11,394,216 B2* | 7/2022 | Jiao | ............... | H02J 7/0045 |
| 11,502,531 B2* | 11/2022 | Sun | ............... | H01M 10/443 |
| 11,581,747 B2* | 2/2023 | Morimoto | ............ | H02J 7/0048 |
| 11,742,685 B2* | 8/2023 | Kanou | ............ | H02J 7/007182 320/107 |
| 11,936,223 B2* | 3/2024 | Kitamura | ............ | H01M 50/202 |
| 12,043,101 B2* | 7/2024 | Maruyama | ............ | B60L 53/22 |
| 12,103,422 B2* | 10/2024 | Pressman | ............ | B60L 53/62 |
| 12,218,531 B2* | 2/2025 | Ogasawara | ........ | G01R 31/3842 |
| 12,227,101 B2* | 2/2025 | Matsuda | ............ | B60L 53/14 |
| 12,261,477 B2* | 3/2025 | Tamaki | ............ | H02J 9/061 |
| 12,266,955 B2* | 4/2025 | Ruan | ............... | H02J 7/00032 |
| 12,289,000 B2* | 4/2025 | Chen | ............... | H02J 7/00308 |
| 12,328,020 B2* | 6/2025 | Chen | ............... | H02J 7/00304 |
| 12,341,172 B2 | 6/2025 | Wang | | |
| 12,372,584 B2* | 7/2025 | Wang | ............... | G01R 31/3648 |
| 2001/0010456 A1* | 8/2001 | Kaite | ............... | H02J 7/0019 320/125 |
| 2003/0006734 A1* | 1/2003 | You | ............... | H02J 7/0013 320/125 |
| 2004/0227487 A1* | 11/2004 | Xiong | ............... | H02J 7/00 320/116 |
| 2005/0068005 A1* | 3/2005 | Yamashita | ........ | H02J 7/007192 320/116 |
| 2007/0024246 A1* | 2/2007 | Flaugher | ............ | H02J 7/007192 320/150 |
| 2007/0176493 A1* | 8/2007 | Koski | ............... | H02J 1/10 307/43 |
| 2008/0290833 A1* | 11/2008 | Hayashi | ............ | H01M 10/482 320/137 |
| 2008/0290835 A1* | 11/2008 | Hayashi | ............ | H01M 50/202 340/636.12 |
| 2009/0072788 A1* | 3/2009 | Delaille | ............ | H02J 7/0019 320/124 |
| 2009/0278496 A1* | 11/2009 | Nakao | ............ | H02J 7/0018 320/118 |
| 2010/0138177 A1* | 6/2010 | Yu | ............... | G01R 31/367 702/63 |
| 2010/0217466 A1* | 8/2010 | Ichikawa | ............ | B60L 58/24 701/22 |
| 2010/0261048 A1* | 10/2010 | Kim | ............... | H02J 7/0063 429/150 |
| 2010/0327810 A1* | 12/2010 | Jimbo | ............ | H02J 7/0071 320/126 |
| 2011/0025263 A1* | 2/2011 | Gilbert | ............ | H02J 7/00712 320/108 |
| 2012/0319653 A1* | 12/2012 | Kumar | ............ | H02J 7/0049 320/118 |
| 2013/0009605 A1 | 1/2013 | Hongo et al. | | |
| 2013/0026989 A1* | 1/2013 | Gibbs | ............ | B60L 58/15 320/116 |
| 2013/0187602 A1* | 7/2013 | Bouman | ............ | B60L 53/20 320/109 |
| 2013/0320772 A1* | 12/2013 | Qiao | ............ | H01M 10/4207 307/85 |
| 2014/0077731 A1* | 3/2014 | Kuwano | ............ | H02J 7/0014 320/126 |
| 2014/0103868 A1* | 4/2014 | Gilbert | ............ | H02J 7/00712 320/108 |

(56) References Cited

U.S. PATENT DOCUMENTS

| | | | |
|---|---|---|---|
| 2014/0239900 A1* | 8/2014 | Abe | H01M 10/482 320/118 |
| 2014/0253040 A1* | 9/2014 | Michalske | H02J 7/0014 320/134 |
| 2015/0180255 A1* | 6/2015 | Kim | B60L 53/65 320/162 |
| 2015/0249355 A1 | 9/2015 | Takano et al. | |
| 2015/0258909 A1* | 9/2015 | Kim | B60H 1/00392 320/155 |
| 2015/0329003 A1* | 11/2015 | Li | B60L 58/16 320/134 |
| 2016/0049814 A1 | 2/2016 | Sugiyama | |
| 2016/0059717 A1* | 3/2016 | Murata | H01M 10/486 903/907 |
| 2016/0126766 A1* | 5/2016 | Zhang | H02J 7/00 320/116 |
| 2016/0172875 A1* | 6/2016 | Lee | H02J 7/0014 320/118 |
| 2016/0318417 A1* | 11/2016 | Suzuki | H01M 10/486 |
| 2016/0359353 A1* | 12/2016 | Sekiguchi | H02J 7/0047 |
| 2017/0063150 A1 | 3/2017 | Sakamoto | |
| 2017/0214253 A1* | 7/2017 | Kim | H02J 7/0018 |
| 2017/0222452 A1* | 8/2017 | Zhang | G01R 31/387 |
| 2017/0269167 A1* | 9/2017 | Willey | H02J 7/0047 |
| 2017/0305284 A1* | 10/2017 | Koh | B60L 53/68 |
| 2017/0310126 A1* | 10/2017 | Nguyen | H02J 7/0024 |
| 2017/0363690 A1* | 12/2017 | Kawamura | G01R 31/3648 |
| 2018/0123362 A1* | 5/2018 | Zheng | H02J 7/0013 |
| 2018/0219390 A1* | 8/2018 | Tkachenko | H02J 7/0016 |
| 2019/0006856 A1* | 1/2019 | Mizoguchi | H02J 7/02 |
| 2019/0148951 A1* | 5/2019 | Wang | B60L 53/305 320/109 |
| 2019/0214831 A1* | 7/2019 | Kristjansson | G06F 1/263 |
| 2019/0222030 A1* | 7/2019 | Ozawa | H02J 7/02 |
| 2019/0245237 A1* | 8/2019 | Qiao | H02J 7/0025 |
| 2019/0353712 A1* | 11/2019 | Willey | H01M 50/569 |
| 2020/0006960 A1* | 1/2020 | Huang | H02J 7/0013 |
| 2020/0073653 A1* | 3/2020 | Jeong | G06F 1/329 |
| 2020/0194849 A1* | 6/2020 | Hwang | H01M 10/46 |
| 2020/0227925 A1* | 7/2020 | Park | H01M 10/4207 |
| 2020/0287397 A1* | 9/2020 | Jiao | H02J 7/0045 |
| 2020/0309857 A1 | 10/2020 | Zehghami et al. | |
| 2021/0028633 A1* | 1/2021 | Kanou | H02J 7/0047 |
| 2021/0036530 A1* | 2/2021 | Kanou | H01M 10/441 |
| 2021/0249875 A1* | 8/2021 | Morimoto | H02J 7/0024 |
| 2021/0344204 A1* | 11/2021 | Mochizuki | H02J 7/02 |
| 2021/0376617 A1* | 12/2021 | Kitamura | H02J 7/0034 |
| 2021/0384751 A1* | 12/2021 | Takahashi | H02J 7/007194 |
| 2022/0029430 A1* | 1/2022 | Wang | H02J 7/00036 |
| 2022/0029445 A1* | 1/2022 | Kanou | H01M 10/425 |
| 2022/0055468 A1 | 2/2022 | Maruyama | |
| 2022/0089054 A1* | 3/2022 | Harshe | H02J 7/0047 |
| 2022/0289065 A1* | 9/2022 | Matsuda | B60L 53/14 |
| 2022/0320875 A1* | 10/2022 | Ogasawara | G01R 31/374 |
| 2022/0329094 A1 | 10/2022 | Sun | |
| 2022/0352746 A1* | 11/2022 | Saito | H02J 9/06 |
| 2023/0083686 A1* | 3/2023 | Ruan | H02J 7/0063 320/117 |
| 2023/0118823 A1* | 4/2023 | Kusagaya | H02J 7/00309 429/7 |
| 2023/0122499 A1* | 4/2023 | Holeton | B60L 58/20 320/109 |
| 2023/0133960 A1* | 5/2023 | Mochizuki | H02J 9/06 320/107 |
| 2023/0141602 A1* | 5/2023 | Tamaki | G01R 31/382 320/132 |
| 2023/0155397 A1* | 5/2023 | Chen | H02M 7/25 307/72 |
| 2023/0155398 A1* | 5/2023 | Chen | B60L 3/0069 307/72 |
| 2023/0182612 A1* | 6/2023 | Ballantyne | B60L 58/13 320/109 |
| 2023/0228822 A1* | 7/2023 | Wang | H02J 7/0048 702/63 |
| 2023/0238814 A1* | 7/2023 | Lu | H01M 10/6551 320/107 |
| 2023/0246478 A1* | 8/2023 | Tamaki | H02J 9/06 307/64 |
| 2023/0253816 A1* | 8/2023 | Wang | H02J 7/04 320/153 |
| 2023/0352947 A1* | 11/2023 | Chen | B60L 53/62 |
| 2023/0382258 A1* | 11/2023 | Pressman | B61C 17/06 |
| 2023/0382266 A1* | 11/2023 | Pressman | B60L 58/22 |
| 2023/0393201 A1* | 12/2023 | Sugimori | G01R 31/367 |
| 2024/0053411 A1* | 2/2024 | Hamada | H02J 7/005 |
| 2024/0055886 A1* | 2/2024 | Kumamoto | H02J 7/00306 |
| 2024/0128747 A1* | 4/2024 | Kitamura | H02J 7/0068 |
| 2024/0140256 A1* | 5/2024 | Murugesapillai | G01R 31/382 |
| 2024/0194967 A1* | 6/2024 | Wang | H01M 10/4207 |
| 2024/0239225 A1* | 7/2024 | Takegata | B60L 53/62 |
| 2024/0304879 A1* | 9/2024 | Ko | B60L 58/18 |
| 2025/0070281 A1* | 2/2025 | Kim | H01M 10/48 |
| 2025/0138095 A1* | 5/2025 | Lim | H02J 7/00036 |
| 2025/0158427 A1* | 5/2025 | Chen | H02J 7/0013 |
| 2025/0167331 A1* | 5/2025 | Hashimoto | B60L 7/24 |
| 2025/0167564 A1* | 5/2025 | Chen | H02M 7/25 |

FOREIGN PATENT DOCUMENTS

| | | |
|---|---|---|
| JP | 2012-085390 A | 4/2012 |
| JP | 2016-010250 A | 1/2016 |
| JP | 2020-036393 A | 3/2020 |

OTHER PUBLICATIONS

Office Action from U.S. Appl. No. 18/051,631 mailed Jul. 2, 2025, 18 pages.

* cited by examiner

| BATTERY TEMPERATURE | COLLECTIVE CHARGE TIME | FIRST BANK CHARGE TIME | SECOND BANK CHARGE TIME | VOLTAGE DROP AMOUNT |
|---|---|---|---|---|
| Lower than 0° C | A0 | B0 | C0 | V0 |
| 0° C or higher and lower than 10° C | A1 | B1 | C1 | V1 |
| 10° C or higher and lower than 20° C | A2 | B2 | C2 | V2 |
| 20° C or higher and lower than 30° C | A3 | B3 | C3 | V3 |
| 30° C or higher and lower than 40° C | A4 | B4 | C4 | V4 |
| 40° C or higher and lower than 50° C | A5 | B5 | C5 | V5 |
| 50° C or higher and lower than 60° C | A6 | B6 | C6 | V6 |
| 60° C or higher | A7 | B7 | C7 | V7 |

FIG. 3

BATTERY BANK UNIT, REMAINING CHARGE TIME CALCULATION METHOD, AND NON TRANSITORY RECORDING MEDIUM STORING COMPUTER READABLE PROGRAM STORING THEREIN FOR CALCULATING REMAINING CHARGE TIME OF BATTERY BANK UNIT

CROSS REFERENCE TO RELATED APPLICATIONS

This application is entitled to or claims the benefit of Japanese Patent Application No. 2021-181218, filed on Nov. 5, 2021, the disclosure of which including the specification, drawings and abstract is incorporated herein by reference in its entirety.

TECHNICAL FIELD

The present disclosure relates to a battery bank unit, a remaining charge time calculation method, and a remaining charge time calculation program.

BACKGROUND ART

Patent Literature 1 discloses a battery bank unit that discharges electricity to a load apparatus connected to an external power source when the external power source is unable to supply power due to a power outage. The battery bank unit includes a plurality of battery banks. The plurality of battery banks are each composed of a plurality of secondary batteries, and are connected in parallel to each other. The plurality of battery banks are charged by electric power from the external power source under ordinary circumstances.

The battery bank unit is configured so that the plurality of battery banks are switched in turn to be charged and a battery bank that is not being charged can discharge electricity to the load apparatus. This allows the battery bank unit to discharge electricity to the load apparatus even while the battery bank unit is charging.

CITATION LIST

Patent Literature

PTL 1
Japanese Patent Application Laid-Open No. 2016-10250

SUMMARY OF INVENTION

Technical Problem

For the load apparatus management, for example, there is a need to know how long it takes to complete the charge of a battery bank unit while the battery bank unit is charging.

The objective of the present disclosure is to provide a battery bank unit capable of accurately calculating time required to complete charging.

Solution to Problem

A battery bank unit according to the present disclosure includes: a first battery bank and a second battery bank that are connected in parallel to each other; and a control apparatus that performs collective charge for collectively charging the first battery bank and the second battery bank, performs first bank charge for charging only the first battery bank after the collective charge, and performs second bank charge for charging only the second battery bank after the first bank charge, wherein, the control apparatus calculates remaining time to complete charge of the battery bank unit based on a temperature of the battery bank unit at a start of the collective charge.

A remaining charge time calculation method according to the present disclosure is a method for a computer to calculate remaining time to complete charge of a battery bank unit, the charge including collective charge for collectively charging a first battery bank and a second battery bank connected in parallel to the first battery bank, first bank charge for charging only the first battery bank after the collective charge, and second bank charge for charging only the second battery bank after the first bank charge, the method including: acquiring a temperature of the battery bank unit at a start of the collective charge; and calculating the remaining time based on the temperature of the battery bank unit.

A remaining charge time calculation program according to the present disclosure is a program stored in a non-transitory storage medium, wherein, when the program is executed by a computer that controls a battery bank unit for which collective charge for collectively charging a first battery bank and a second battery bank connected in parallel to the first battery bank is performed, first bank charge for charging only the first battery bank is performed after the collective charge, and second bank charge for charging only the second battery bank is performed after the first bank charge, the program is configured to cause the computer to perform operations including: acquiring a temperature of the battery bank unit at a start of the collective charge; and calculating remaining time to complete charge of the battery bank unit based on the temperature of the battery bank unit.

Advantageous Effects of Invention

According to the present disclosure, it is possible to provide a battery bank unit capable of accurately calculating time required to complete charging.

BRIEF DESCRIPTION OF DRAWINGS

FIG. 3 illustrates a table;

DESCRIPTION OF EMBODIMENTS

Embodiment 1

Figure 1:
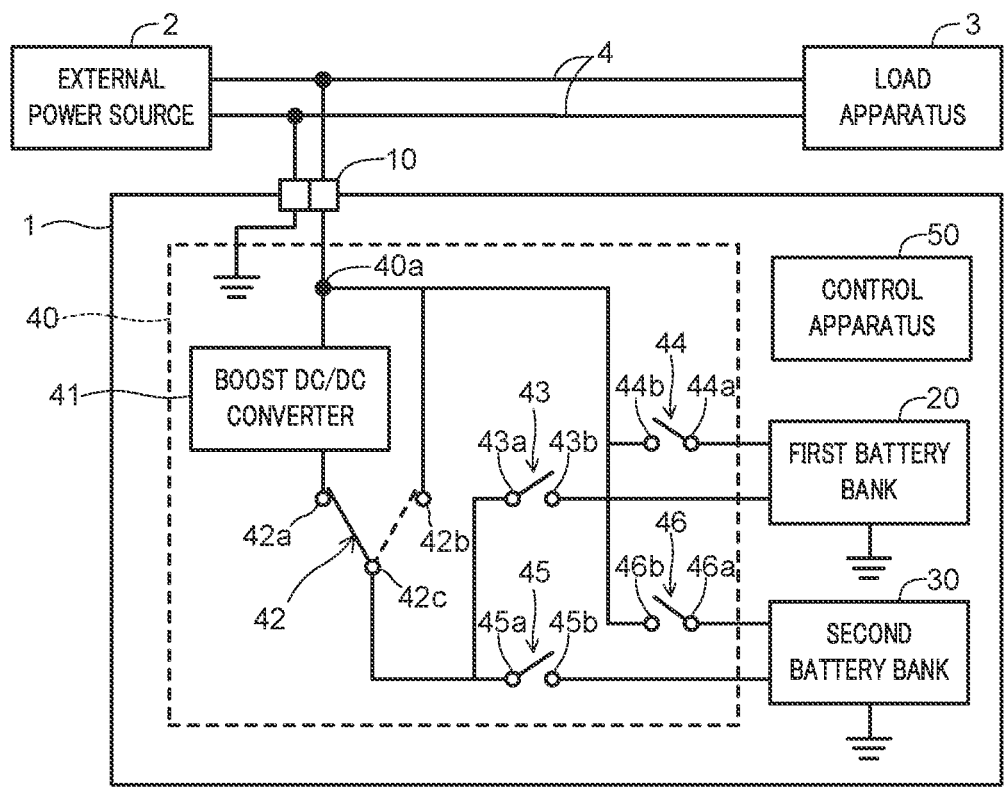
FIG. 1 is a schematic diagram illustrating a battery bank unit in Embodiment 1 of the present disclosure.

Hereinafter, a battery bank unit according to Embodiment 1 of the present disclosure will be described with reference to the accompanying drawings. FIG. 1 is a schematic diagram illustrating battery bank unit 1 in Embodiment 1 of the present disclosure. Battery bank unit 1 supplies power to load apparatus 3 connected to external power source 2 when external power source 2 loses power. Battery bank unit 1 is charged by power from external power source 2.

External power source 2 is, for example, an apparatus that converts commercial AC power into DC power and outputs the DC power. Load apparatus 3 is an apparatus (e.g., server apparatus) that operates with DC power.

As illustrated in FIG. 1, battery bank unit 1 includes input/output terminal 10, first and second battery banks 20 and 30, charge/discharge circuitry 40, and control apparatus 50.

Input/output terminal 10 is connected to power line 4 that supplies power to load apparatus 3 from external power source 2.

First and second battery banks 20 and 30 are composed of a plurality of secondary batteries (e.g., nickel-hydrogen secondary batteries) connected in series, for example. Note that the secondary battery is not necessarily a nickel-hydrogen secondary battery, and may be another secondary battery such as a lithium-ion secondary battery. The configurations of first and second battery banks 20 and 30 are similar to each other. First and second battery banks 20 and 30 are connected in parallel to each other.

Charge/discharge circuitry 40 functions as circuitry that performs charge and discharge of first and second battery banks 20 and 30 via input/output terminal 10. Charge/discharge circuitry 40 includes boost DC/DC converter 41, switch 42, first charge switch 43, first discharge switch 44, second charge switch 45, and second discharge switch 46.

Boost DC/DC converter 41 is a power conversion apparatus that boosts power supplied from external power source 2 and outputs the boosted power.

Switch 42 switches a value of voltage applied to first and second battery banks 20 and 30. In switch 42, first terminal 42a is connected to an output terminal of boost DC/DC converter 41, and second terminal 42b is connected to input/output terminal 10. Additionally, third terminal 42c is connected to first and second battery banks 20 and 30 via first and second charge switches 43 and 45.

When switch 42 is in the on state, first terminal 42a and third terminal 42c are connected to each other, and the power outputted from boost DC/DC converter 41 is supplied to first and second battery banks 20 and 30 via first and second charge switches 43 and 45. In contrast, when switch 42 is in the off state, second terminal 42b and third terminal 42c are connected to each other, and the power outputted from external power source 2 is supplied to first and second battery banks 20 and 30 via first and second charge switches 43 and 45.

First charge switch 43 allows first battery bank 20 to be charged when in the on state, and does not allow first battery bank 20 to be charged when in the off state. In first charge switch 43, first terminal 43a is connected to third terminal 42c of switch 42 and second terminal 43b is connected to the positive electrode of first battery bank 20. Note that the negative electrode of first battery bank 20 is connected to the ground.

First discharge switch 44 allows first battery bank 20 to discharge when in the on state, and does not allow first battery bank 20 to discharge when in the off state. In first discharge switch 44, first terminal 44a is connected to the positive electrode of first battery bank 20 and second terminal 44b is connected to input/output terminal 10.

Second charge switch 45 allows second battery bank 30 to be charged when in the on state, and does not allow second battery bank 30 to be charged when in the off state. In second charge switch 45, first terminal 45a is connected to third terminal 42c of switch 42 and second terminal 45b is connected to the positive electrode of second battery bank 30. Note that the negative electrode of second battery bank 30 is connected to the ground.

Second discharge switch 46 allows second battery bank 30 to discharge when in the on state, and does not allow second battery bank 30 to discharge when in the off state. In second discharge switch 46, first terminal 46a is connected to the positive electrode of second battery bank 30 and second terminal 46b is connected to input/output terminal 10.

Figure 2:
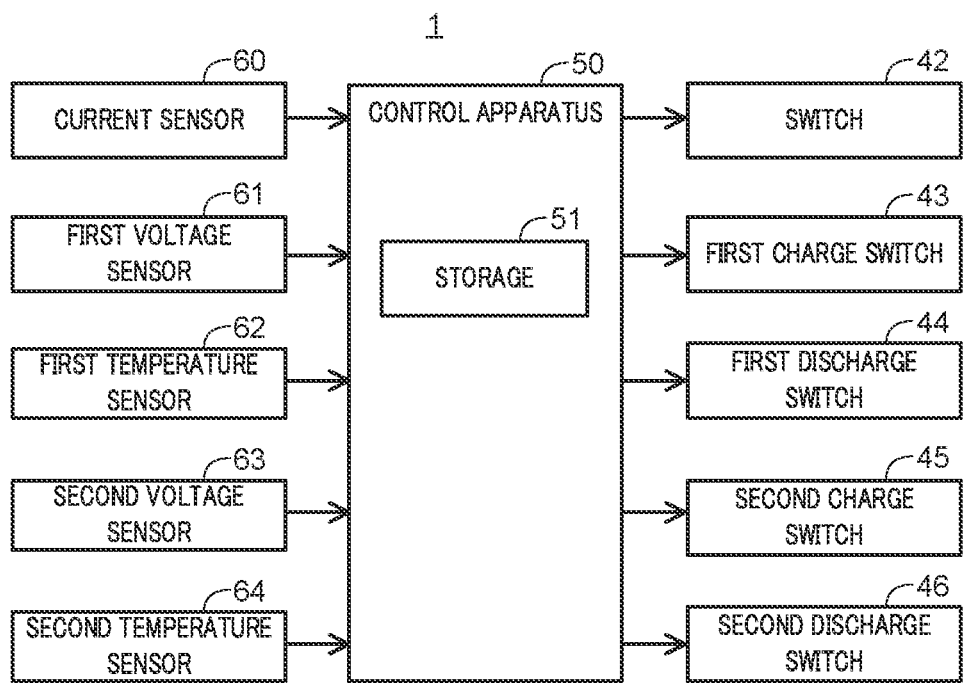
FIG. 2 is a block diagram of the battery bank unit.

FIG. 2 is a block diagram of battery bank unit 1. As illustrated in FIG. 2, battery bank unit 1 further includes current sensor 60, first voltage sensor 61, first temperature sensor 62, second voltage sensor 63, and second temperature sensor 64.

Current sensor 60 detects a value of current flowing in or out of power line 4 via input/output terminal 10. To be more specific, current sensor 60 detects a value of current between input/output terminal 10 and connecting point 40a of charge/discharge circuitry 40. First voltage sensor 61 detects a voltage value of first battery bank 20. First temperature sensor 62 detects the temperature of first battery bank 20.

Second voltage sensor 63 detects a voltage value of second battery bank 30. Second temperature sensor 64 detects the temperature of second battery bank 30. Current sensor 60, first voltage sensor 61, first temperature sensor 62, second voltage sensor 63, and second temperature sensor 64 each transmit the detected value to control apparatus 50.

Battery bank unit 1 further includes a third voltage sensor (not illustrated) that detects a power source voltage value that is a voltage value of external power source 2. Control apparatus 50 detects a power outage of external power source 2 based on the power source voltage value detected by the third voltage sensor.

Control apparatus 50 controls the charge/discharge of battery bank unit 1 by controlling the states of switches 42 to 46. Control apparatus 50 includes storage 51. Storage 51 stores table T illustrated in FIG. 3.

Table T is a table that is referred to when control apparatus 50 calculates remaining time that is the time required to complete the charge of battery bank unit 1 to be described later. In table T, the temperature, collective charge time, first bank charge time, second bank charge time, and voltage drop amount are associated with each other. In table T, the temperature is divided into eight temperature zones in total, and between 0° C. and 60° C., there are six zones each including a range of 10° C. Needless to say, the temperature range in each temperature zone and the number of temperature zones are not limited to those illustrated in FIG. 3. The collective charge time, first bank charge time, second bank charge time, and voltage drop amount will be described later in detail.

Control apparatus 50 also calculates the state of charge (SOC) of battery bank unit 1 by a known method based on the current value detected by current sensor 60. The SOC of battery bank unit 1 is a charge rate (%) corresponding to the sum of the charge amounts of first and second battery banks 20 and 30.

Figure 4:
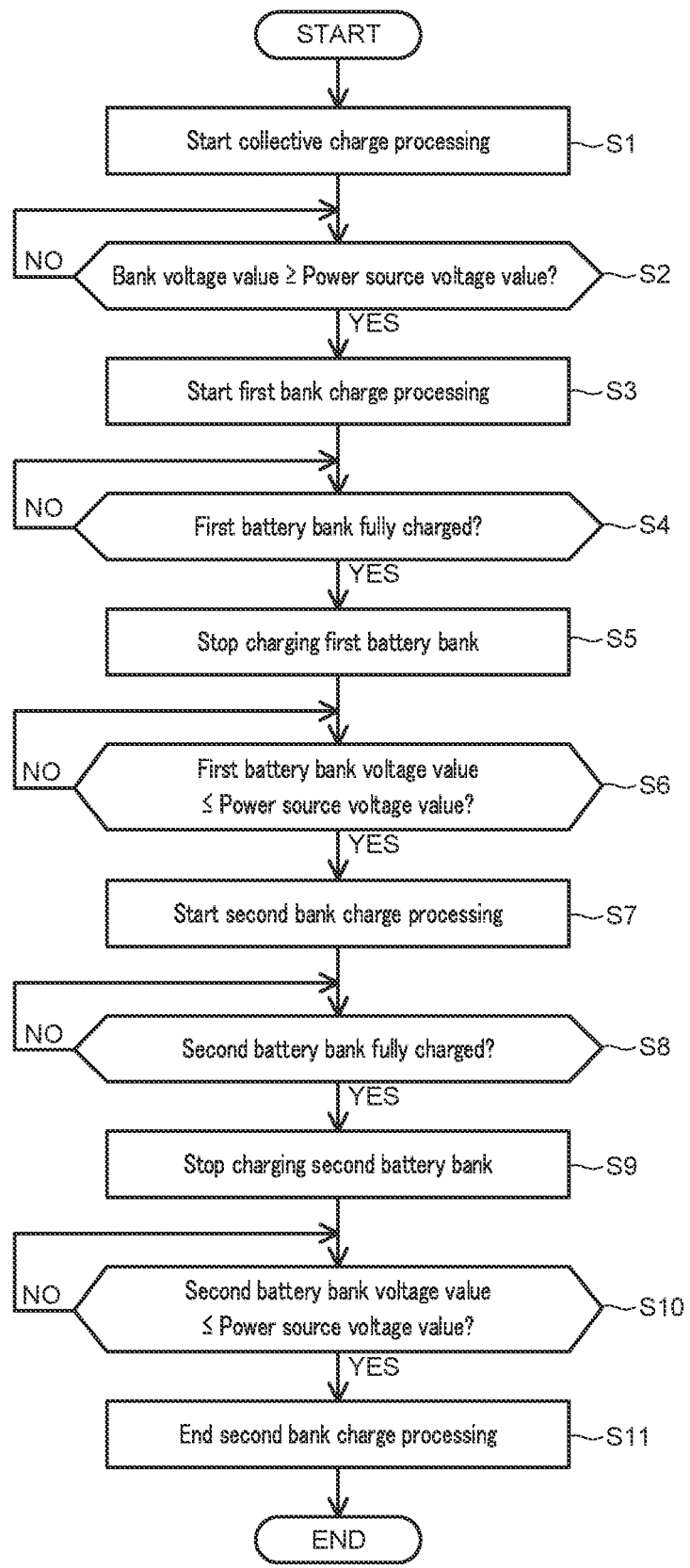
FIG. 4 is a flowchart illustrating a procedure performed by a control apparatus to charge the battery bank unit.

Next, charge control for battery bank unit 1 performed by control apparatus 50 will be described with reference to the flowchart in FIG. 4 and the timing chart in FIG. 5.

In a state where the charge control is not started, switch 42 and first and second charge switches 43 and 45 are all in the off state and first and second discharge switches 44 and 46 are both in the on state: accordingly, the discharge of first and second battery banks 20 and 30 are allowed. As described above, the configurations of first and second battery banks 20 and 30 are similar to each other, and they are connected in parallel. Thus, the voltage values and charge amounts of first and second battery banks 20 and 30 are approximately equal to each other. That is, the SOC of battery bank unit 1 is approximately equal to each of the SOCs of first and second battery banks 20 and 30.

Control apparatus 50 starts the charge control when detecting connection to external power source 2 or detecting the end of the power outage of external power source 2 based on the detection value of the third voltage sensor.

Control apparatus 50 starts collective charge processing in S1. The collective charge processing is processing of charging first and second battery banks 20 and 30 collectively. To be more specific, as illustrated in FIG. 5, control apparatus 50 switches switch 42 and first and second charge switches 43 and 45 to the on state (time t0) from the state where switch 42 and first and second charge switches 43 and 45 are all in the off state and first and second discharge switches 44 and 46 are both in the on state.

First and second discharge switches 44 and 46 remain the on state. This allows battery bank unit 1 to discharge to load apparatus 3 even when external power source 2 loses power during the collective charge processing.

When the collective charge processing is started (time t0), power is supplied from boost DC/DC converter 41 to first and second battery banks 20 and 30, and the voltage values of first and second battery banks 20 and 30 increase.

Figure 5:
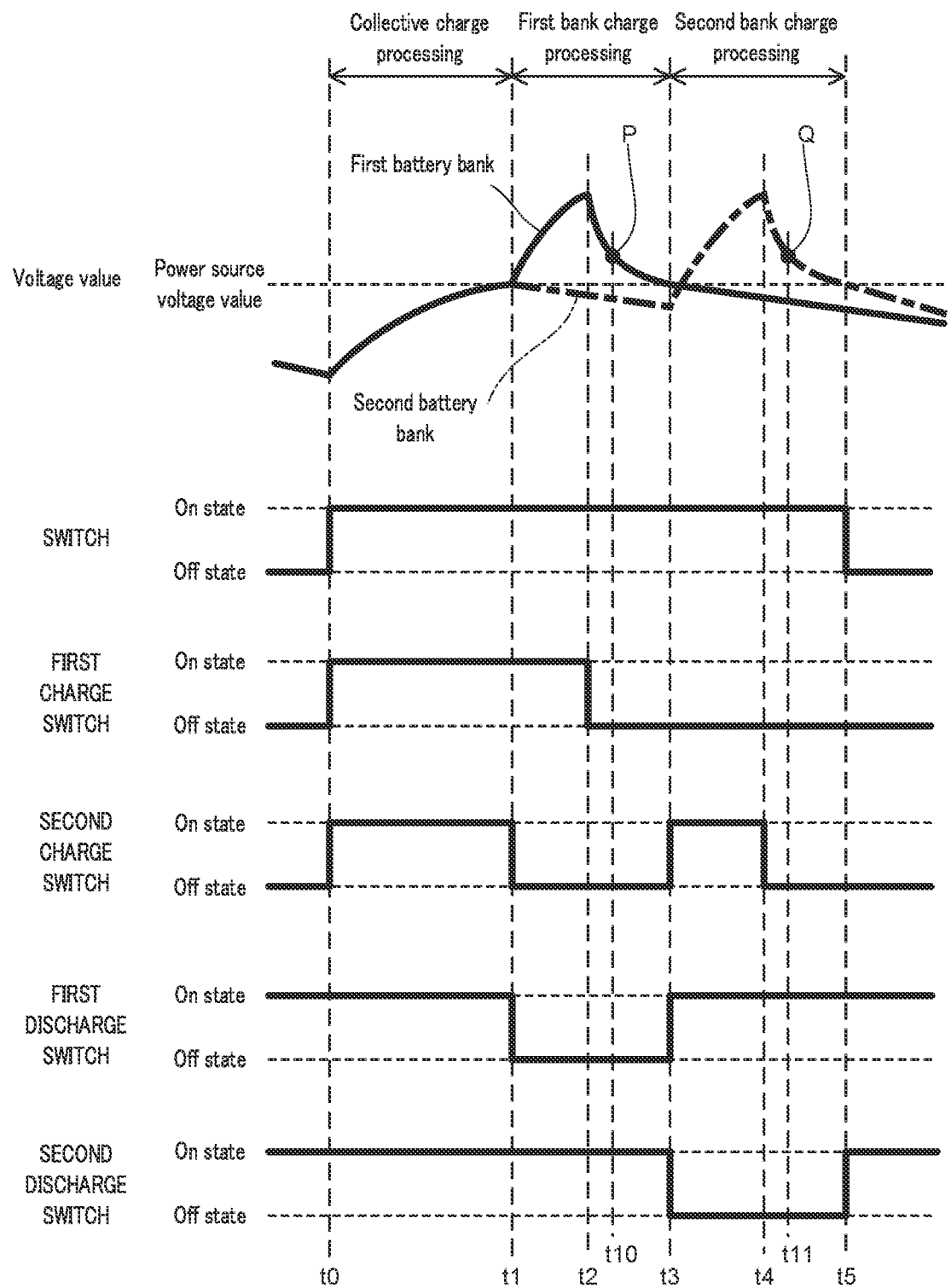
FIG. 5 is a timing chart for the procedure in the flowchart in FIG. 4.

In FIG. 5, the solid-line voltage value indicates the voltage value of first battery bank 20, and the chain-line voltage value indicates the voltage value of second battery bank 30. The voltage values of first and second battery banks 20 and 30 are approximately equal before the start of the collective charge processing and during the collective charge processing. Thus, the lines indicating the voltage values of first and second battery banks 20 and 30 are overlapped with each other, resulting in the solid line.

Next, in S2, control apparatus 50 determines whether the bank voltage value, which is the voltage value of battery bank unit 1, is equal to or greater than the power source voltage value. The bank voltage value is specifically a mean value of the voltage value of first battery bank 20 and the voltage value of second battery bank 30. Note that the bank voltage value may be either one of the voltage values of first and second battery banks 20 and 30. When the bank voltage value is lower than the power source voltage value (NO in S2), the collective charge processing is continued.

Meanwhile, when the voltage values of first and second battery banks 20 and 30 increase and the bank voltage value becomes equal to or higher than the power source voltage value (time t1; YES in S2), control apparatus 50 ends the collective charge processing and starts first bank charge processing in S3.

The first bank charge processing is processing of charging only first battery bank 20. In the first bank charge processing, first battery bank 20 is fully charged at a voltage value higher than the power source voltage value. Second battery bank 30 is not charged in the first bank charge processing.

To be more specific, control apparatus 50 switches second charge switch 45 to the off state and first discharge switch 44 to the off state (time t1). As a result, the power of boost DC/DC converter 41 is supplied only to first battery bank 20, and the voltage value of first battery bank 20 further increases from the power source voltage value. In the first bank charge processing, first discharge switch 44 is in the off state and first battery bank 20 does not discharge. This makes it possible to prevent application of a voltage value higher than the power source voltage value to load apparatus 3, thereby preventing failure of load apparatus 3, for example.

Meanwhile, the charge of second battery bank 30 is stopped, and the voltage value of second battery bank 30 gradually decreases due to self-discharge. Second discharge switch 46 is in the on state in first bank charge processing. Thus, second battery bank 30 can discharge to load apparatus 3 even when external power source 2 loses power during the first bank charge processing.

Subsequently, control apparatus 50 determines whether first battery bank 20 is fully charged in S4. To be more specific, control apparatus 50 determines whether the detection value of first temperature sensor 62 has reached a predetermined first temperature. The first temperature is a temperature at which first battery bank 20 is fully charged. When the detection value of first temperature sensor 62 is lower than the first temperature (NO in S4), control apparatus 50 continues to charge first battery bank 20 only.

In contrast, when first battery bank 20 is fully charged and the detection value of first temperature sensor 62 reaches the first temperature (time t2; YES in S4), control apparatus 50 stops charging first battery bank 20 in S5.

To be more specific, control apparatus 50 switches first charge switch 43 to the off state (time t2). As a result, the charge of first battery bank 20 is stopped, and the voltage value of first battery bank 20 gradually decreases due to self-discharge. At this time, the temperature of first battery bank 20 is higher than the temperature of second battery bank 30. Thus, the drop amount of the voltage value of first battery bank 20 per unit time is larger than the drop amount of the voltage value of second battery bank 30 per unit time.

Next, in S6, control apparatus 50 determines whether the voltage value of first battery bank 20 is equal to or lower than the power source voltage value. When the voltage value of first battery bank 20 is higher than the power source voltage value (NO in S6), control apparatus 50 continues the state where first and second battery banks 20 and 30 are not charged.

When the voltage value of first battery bank 20 is equal to or lower than the power source voltage value (time t3; YES in S6), in contrast, control apparatus 50 ends the first bank charge processing and starts second bank charge processing in S7.

The second bank charge processing is processing of charging only second battery bank 30. In the second bank charge processing, second battery bank 30 is fully charged at a voltage value higher than the power source voltage value. First battery bank 20 is not charged in the second bank charge processing.

To be more specific, control apparatus 50 switches second charge switch 45 to the on state, first discharge switch 44 to the on state, and second discharge switch 46 to the off state (time t3). As a result, power is supplied from boost DC/DC converter 41 to second battery bank 30 only, and the voltage value of second battery bank 30 increases and exceeds the power source voltage value. In the second bank charge processing, second discharge switch 46 is in the off state and second battery bank 30 does not discharge. This makes it possible to prevent application of a voltage value higher than the power source voltage value to load apparatus 3, thereby preventing failure of load apparatus 3, for example.

Meanwhile, the charge of first battery bank 20 remains stopped, and the voltage value of first battery bank 20 gradually decreases due to self-discharge. First discharge switch 44 is in the on state in second bank charge processing. Thus, first battery bank 20 can discharge to load apparatus 3 even when external power source 2 loses power during the second bank charge processing.

Then, control apparatus 50 determines whether second battery bank 30 is fully charged in S8. To be more specific, control apparatus 50 determines whether the detection value of second temperature sensor 64 has reached a predetermined second temperature. The second temperature is the temperature at which second battery bank 30 is fully charged. When the detection value of second temperature sensor 64 is lower than the second temperature (NO in S8), control apparatus 50 continues to charge second battery bank 30 only. Note that the second temperature may be the same as the first temperature, which is the temperature at which first battery bank 20 is fully charged.

In contrast, when second battery bank 30 is fully charged and the detection value of second temperature sensor 64 reaches the second temperature (time t4; YES in S8), control apparatus 50 stops charging second battery bank 30 in S9.

To be more specific, control apparatus 50 switches second charge switch 45 to the off state (time t4). Accordingly, the charge of second battery bank 30 is stopped, and the voltage of second battery bank 30 gradually decreases due to self-discharge. At this time, the temperature of second battery bank 30 is higher than the temperature of first battery bank 20. Thus, the drop amount of the voltage value of second battery bank 30 per unit time is larger than the drop amount of the voltage value of first battery bank 20 per unit time.

Next, in S10, control apparatus 50 determines whether the voltage value of second battery bank 30 is equal to or lower than the power source voltage value. When the voltage value of second battery bank 30 is higher than the power source voltage value (NO in S10), control apparatus 50 continues the state where first and second battery banks 20 and 30 are not charged.

When the voltage value of second battery bank 30 is equal to or lower than the power source voltage value (time t5; YES in S10), in contrast, control apparatus 50 ends the second bank charge processing in S11. To be more specific, control apparatus 50 switches switch 42 to the off state and second discharge switch 46 to the on state (time t5). This is the end of the charge of battery bank unit 1. Control apparatus 50 specifies the SOC of battery bank unit 1 at the end of the charge of battery bank unit 1 as 100%.

Note that battery bank unit 1 may include three or more battery banks. In a case of including m battery banks, the m battery banks are collectively charged in the collective charge processing. When the collective charge processing is finished, m battery banks are charged one by one in turn as is the case with the above first and second bank charge processing.

Next, control for calculating remaining time performed by control apparatus 50 will be described with reference to the flowcharts in FIGS. 6A and 6B. The remaining time is time required to complete the charge of battery bank unit 1. Control apparatus 50 calculates the remaining time while performing the charge control described above.

In S20, control apparatus 50 acquires, from table T, collective charge time, first bank charge time, and second bank charge time that are associated with the temperature at the start of the collective charge processing for battery bank unit 1. The temperature of battery bank unit 1 is, for example, the mean temperature of first and second battery banks 20 and 30. Note that the temperature of battery bank unit 1 may be either one of the temperatures of first and second battery banks 20 and 30.

The collective charge time corresponds to the time required from the start (time t0 in FIG. 5) to the end (time t1 in FIG. 5) of collective charge processing in a case where the SOC of battery bank unit 1 at the start of the collective charge processing is a first predetermined charge rate (e.g., 0%). The first predetermined charge rate is any value determined in, for example, an experiment performed to determine the collective charge time stored in table T in advance.

The first bank charge time corresponds to the time required from the start (time t1) to the end (time t3) of first bank charge processing. The second bank charge time corresponds to the time required from the start (time t3) to the end (time t5) of second bank charge processing. The collective charge time, first bank charge time, and second bank charge time are determined for each temperature zone by actual measurement performed in advance through experiments, for example, and are stored in table T.

In a case where the temperature of battery bank unit 1 is 25° C. at the start of the charge of battery bank unit 1, for example, control apparatus 50 acquires the collective charge time "A3", first bank charge time "B3", and second bank charge time "C3" that are associated with the temperature "20° C. or higher and lower than 30° C." from table T in FIG. 3.

Subsequently, control apparatus 50 calculates the remaining time in S21. To be more specific, control apparatus 50 calculates the remaining time at the start of charge, which is the remaining time at the time of starting the charge, using Expression 1.

[1]

$$\text{Remaining time at the start of charge} = Tm0 + Tm1 + Tm2 \qquad \text{(Expression 1)}$$

In Expression 1, Tm0, Tm1, and Tm2 respectively represent the collective charge time, first bank charge time, and second bank charge time acquired from table T.

Control apparatus 50 also indicates the calculated remaining time at the start of charge to load apparatus 3. Load apparatus 3 displays the remaining time at the start of charge on a display section such as a display. This allows an administrator of load apparatus 3 to recognize the time from the start to the completion of the charge of battery bank unit 1.

Further, control apparatus 50 measures the time elapsed from the start of the charge of battery bank unit 1. Control apparatus 50 subtracts the elapsed time from the remaining time at the start of charge calculated in S21 at predetermined time intervals to calculate the remaining time at that time, updates the remaining time to the latest, and indicates the updated remaining time to load apparatus 3. Load apparatus 3 displays the updated remaining time on the display section.

Next, in S22, control apparatus 50 determines whether the collective charge processing has ended. When the collective charge processing is in progress (NO in S22), control apparatus 50 continues updating and indicating the remaining time.

When the collective charge processing has ended (YES in S22), control apparatus 50 corrects the remaining time in S23. To be more specific, control apparatus 50 corrects the remaining time based on the actual collective charge time, which is the time actually spent for the collective charge processing. Control apparatus 50 subtracts the actual collective charge time from the collective charge time acquired from table T, and adds the calculated value to the remaining time at the end of the collective charge processing.

That is, control apparatus 50 corrects the remaining time by using the difference between the experimental value (collective charge time) and the measured value (actual collective charge time) of the time required for the collective charge processing. This allows control apparatus 50 to accurately correct the remaining time at the end of collective charge. Note that control apparatus 50 need not correct the remaining time in S23.

Then, control apparatus 50 updates the collective charge time in S24. To be more specific, control apparatus 50 updates the collective charge time associated with the temperature of battery bank unit 1 at the start of the charge with the actual collective charge time in table T. For example, in the case where the temperature of battery bank unit 1 is 25° C. at the start of the charge of battery bank unit 1, control apparatus 50 updates the collective charge time "A3" associated with the temperature "20° C. or higher and lower than 30° C." in table T with the actual collective charge time.

Next, in S25, control apparatus 50 determines whether the charge of first battery bank 20 is stopped during the first bank charge processing. When first battery bank 20 is not fully charged and the charge of first battery bank 20 is not stopped (NO in S25), control apparatus 50 continues updating and indicating the remaining time.

Meanwhile, when first battery bank 20 is fully charged and the charge of first battery bank 20 is stopped (YES in S25), control apparatus 50 determines, in S26, whether the temperature of first battery bank 20 is equal to or lower than a first determination temperature. The first determination temperature is a temperature of first battery bank 20 when the drop amount of the voltage value of first battery bank 20 per unit time is almost constant. When the charge of first battery bank 20 is stopped (time t2), the temperature of first battery bank 20 is relatively high and the drop amount of the voltage value of first battery bank 20 per unit time is relatively large. After that, as the voltage value of first battery bank 20 decreases due to self-discharge, the drop amount of the voltage value of first battery bank 20 per unit time becomes smaller and almost constant at and after point P (time t10) in FIG. 5. That is, the first determination temperature is specified to be the temperature of first battery bank 20 at point P. The first determination temperature is specified by actual measurement performed in advance through experiments or the like.

Note that control apparatus 50 may calculate the first determination temperature. To be more specific, control apparatus 50 calculates the first determination temperature by adding the first predetermined temperature to the temperature of first battery bank 20 at the start of the collective charge processing. The first predetermined temperature is determined in advance by experimentally measuring the relation between the temperature of first battery bank 20 at the start of the collective charge processing and the temperature of first battery bank 20 at which the drop amount of the voltage value of first battery bank 20 per unit time is almost constant. Note that the first determination temperature may be a temperature obtained by adding the first predetermined temperature to the temperature of first battery bank 20 at the start of the first bank charge processing.

When the temperature of first battery bank 20 is higher than the first determination temperature (NO in S26), control apparatus 50 continues updating and indicating the remaining time. When the temperature of first battery bank 20 is decreased and becomes equal to or lower than the first determination temperature (YES in S26), control apparatus 50 acquires the voltage drop amount from table T in S27. Specifically, control apparatus 50 acquires, from table T, the voltage drop amount associated with the temperature of first battery bank 20 at that time.

For example, when the temperature of first battery bank 20 is 45° C. at that time, control apparatus 50 acquires the voltage drop amount "V5" associated with the temperature "40° C. or higher and lower than 50° C." from table T in FIG. 3. The voltage drop amount is a drop amount of the voltage value of first battery bank 20 per unit time after first battery bank 20 is fully charged and stops charging. The voltage drop amount is determined for each temperature zone by actual measurement performed in advance through experiments, for example, and is stored in table T.

Subsequently, control apparatus 50 corrects the remaining time in S28. First, control apparatus 50 calculates, based on the voltage drop amount acquired from table T, a first charge stop time, which is the time required from when the temperature of first battery bank 20 becomes equal to or lower than the first determination temperature to when the second bank charge processing is started (time t3). To be more specific, control apparatus 50 calculates the first charge stop time by subtracting the power source voltage value from the voltage value of first battery bank 20 at the time when the temperature of first battery bank 20 becomes equal to or lower than the first determination temperature, and dividing the subtracted value by the voltage drop amount acquired from table T.

Control apparatus 50 corrects the remaining time based on the calculated first charge stop time. Specifically, control apparatus 50 corrects the remaining time by replacing the remaining time at the time when the temperature of first battery bank 20 becomes equal to or lower than the first determination temperature with the sum of the calculated first charge stop time and the second bank charge time acquired in S20. After the temperature of first battery bank 20 becomes equal to or lower than the first determination temperature, control apparatus 50 subtracts the time elapsed from when the temperature of first battery bank 20 becomes equal to or lower than the first determination temperature from the corrected remaining time at predetermined time intervals to calculate the remaining time at that time and update the remaining time to the latest. Control apparatus 50 then indicates the updated remaining time to load apparatus 3. This allows control apparatus 50 to accurately correct the remaining time while the charge of first battery bank 20 is stopped during the first bank charge processing.

Next, in S29, control apparatus 50 determines whether the second bank charge processing has started. When the second bank charge processing has not started (NO in S29), control apparatus 50 continues updating and indicating the remaining time.

When second bank charge processing has started (YES in S29), in contrast, control apparatus 50 corrects the remaining time in S30. Specifically, control apparatus 50 replaces the remaining time at time t3 (at the start of the second bank charge processing) with the actual first bank charge time that is the time actually spent for the first bank charge processing. When the remaining time at time t3 is corrected, control apparatus 50 updates the latest remaining time as follows. That is, control apparatus 50 subtracts the time elapsed from time t3 from the actual first bank charge time at predetermined time intervals after time t3 to calculate the remaining time at that time and update the remaining time to the latest. Control apparatus 50 then indicates the updated remaining time to load apparatus 3.

The configurations of first and second battery banks 20 and 30 are similar to each other as described above, and the surroundings (e.g., temperature and humidity) of first and second battery banks 20 and 30 are almost the same. Accordingly, the actual duration of the second bank charge processing is approximately equal to the actual first bank charge time. That is, when the first bank charge processing is finished, control apparatus 50 can accurately correct the remaining time by replacing the remaining time with the actual first bank charge time, and indicate the corrected remaining time. Note that control apparatus 50 need not correct the remaining time in S30.

Next, in S31, control apparatus 50 determines whether the charge of second battery bank 30 is stopped during the second bank charge processing. When second battery bank 30 is not fully charged and the charge of second battery bank 30 is not stopped (NO in S31), control apparatus 50 continues updating and indicating the remaining time.

Meanwhile, when second battery bank 30 is fully charged and the charge of second battery bank 30 is stopped (YES in S31), control apparatus 50 determines, in S32, whether the temperature of second battery bank 30 is equal to or lower than a second determination temperature. The second determination temperature is a temperature of second battery bank 30 when the drop amount of the voltage value of second battery bank 30 per unit time is almost constant. When the charge of second battery bank 30 is stopped (time t4), the temperature of second battery bank 30 is relatively high and the drop amount of the voltage value of second battery bank 30 per unit time is relatively large. After that, as the voltage value of second battery bank 30 decreases due to self-discharge, the drop amount of the voltage value of second battery bank 30 per unit time becomes smaller and almost constant at and after point Q (time t11) in FIG. 5. That is, the second determination temperature is specified to be the temperature of second battery bank 30 at point Q. The second determination temperature is specified in advance by actual measurement through experiments or the like. Note that the second determination temperature may be the same as the first determination temperature in a case where the configurations of first and second battery banks 20 and 30 are similar to each other.

Note that control apparatus 50 may calculate the second determination temperature. To be more specific, control apparatus 50 calculates the second determination temperature by adding a second predetermined temperature to the temperature of second battery bank 30 at the start of the collective charge processing. The second predetermined temperature is determined in advance by experimentally measuring the relation between the temperature of second battery bank 30 at the start of the collective charge processing and the temperature of second battery bank 30 at which the drop amount of the voltage value of second battery bank 30 per unit time is almost constant. Note that the second determination temperature may be a temperature obtained by adding the second predetermined temperature to the temperature of second battery bank 30 at the start of the second bank charge processing. In addition, the second predetermined temperature may be the same as the first predetermined temperature in a case where the configurations of first and second battery banks 20 and 30 are similar to each other.

When the temperature of second battery bank 30 is higher than the second determination temperature (NO in S32), control apparatus 50 continues updating and indicating the remaining time. When the temperature of second battery bank 30 is decreased and becomes equal to or lower than the second determination temperature (YES in S32), control apparatus 50 acquires the voltage drop amount from table T in S33. Specifically, control apparatus 50 acquires, from table T, the voltage drop amount associated with the temperature of second battery bank 30 at that time.

For example, when the temperature of second battery bank 30 is 45° C. at that time, control apparatus 50 acquires the voltage drop amount "V5" associated with the temperature "40° C. or higher and lower than 50° C." from table T.

Subsequently, control apparatus 50 corrects the remaining time in S34. First, control apparatus 50 calculates, based on the voltage drop amount acquired from table T, a second charge stop time, which is the time required from when the temperature of second battery bank 30 becomes equal to or lower than the second determination temperature to when the second bank charge processing is finished (time t5). To be more specific, control apparatus 50 calculates the second charge stop time by subtracting the power source voltage value from the voltage value of second battery bank 30 at the time when the temperature of second battery bank 30 becomes equal to or lower than the second determination temperature, and dividing the subtracted value by the voltage drop amount acquired from table T.

Control apparatus 50 corrects the remaining time based on the calculated second charge stop time. Specifically, control apparatus 50 corrects the remaining time by replacing the remaining time at the time when the temperature of the second battery bank 20 becomes equal to or lower than the second determination temperature with the calculated second charge stop time. After the temperature of second battery bank 30 becomes equal to or lower than the second determination temperature, control apparatus 50 subtracts the time elapsed from when the temperature of second battery bank 30 becomes equal to or lower than the second determination temperature from the corrected remaining time at predetermined time intervals to calculate the remaining time at that time and update the remaining time to the latest. Control apparatus 50 then indicates the updated remaining time to load apparatus 3. This allows control apparatus 50 to accurately correct the remaining time while the charge of second battery bank 30 is stopped during the second bank charge processing.

Next, in S35, control apparatus 50 determines whether the second bank charge processing has ended. When the second bank charge processing has not ended (NO in S35), control apparatus 50 continues updating and indicating the remaining time.

Meanwhile, when the second bank charge processing has ended (YES in S35), control apparatus 50 updates the first and second bank charge times in S36. To be more specific, control apparatus 50 updates the first bank charge time associated with the temperature of battery bank unit 1 at the start of the charge with the actual first bank charge time in table T. For example, in the case where the temperature of battery bank unit 1 is 25° C. at the start of the charge of battery bank unit 1, control apparatus 50 updates the first bank charge time "B3" associated with the temperature "20° C. or higher and lower than 30° C." in table T with the actual first bank charge time.

Additionally, in table T, control apparatus 50 updates the second bank charge time associated with the temperature of battery bank unit 1 at the start of the charge with the actual second bank charge time that is the time actually spent for the second bank charge processing. For example, in the case where the temperature of battery bank unit 1 is 25° C. at the start of the charge of battery bank unit 1, control apparatus 50 updates the second bank charge time "C3" associated with the temperature "20° C. or higher and lower than 30° C." in table T with the actual second bank charge time. After updating the second bank charge time, control apparatus 50 ends the control for calculating the remaining time.

The actual collective charge time, actual first bank charge time, and actual second bank charge time vary depending on the surroundings of battery bank unit 1, power source voltage value, temperatures of first and second battery banks 20 and 30, aging of battery bank unit 1, and degree of deterioration of first and second battery banks 20 and 30 (hereinafter, referred to as the surroundings of battery bank unit 1, etc.). By updating table T with the actual collective charge time, actual first bank charge time, and actual second bank charge time, it is possible to make the values stored in table T match the surroundings of battery bank unit 1, etc. Thus, control apparatus 50 updates table T so as to adapt to a change in the surroundings of battery bank unit 1, etc. every time first and second battery banks 20 and 30 are charged, thereby accurately calculating the remaining time in performing the charge control.

Embodiment 2

Next, Embodiment 2 of the present disclosure will be described mainly about aspects different from the above Embodiment 1. Table T in Embodiment 2 has no voltage drop amount. In addition, the control for calculating the remaining time performed by control apparatus 50 in Embodiment 2 is different from that in the above Embodiment 1. In the following, the control for calculating the remaining time in Embodiment 2 will be described with reference to FIGS. 6A, 7A, and 7B.

Figure 6A:
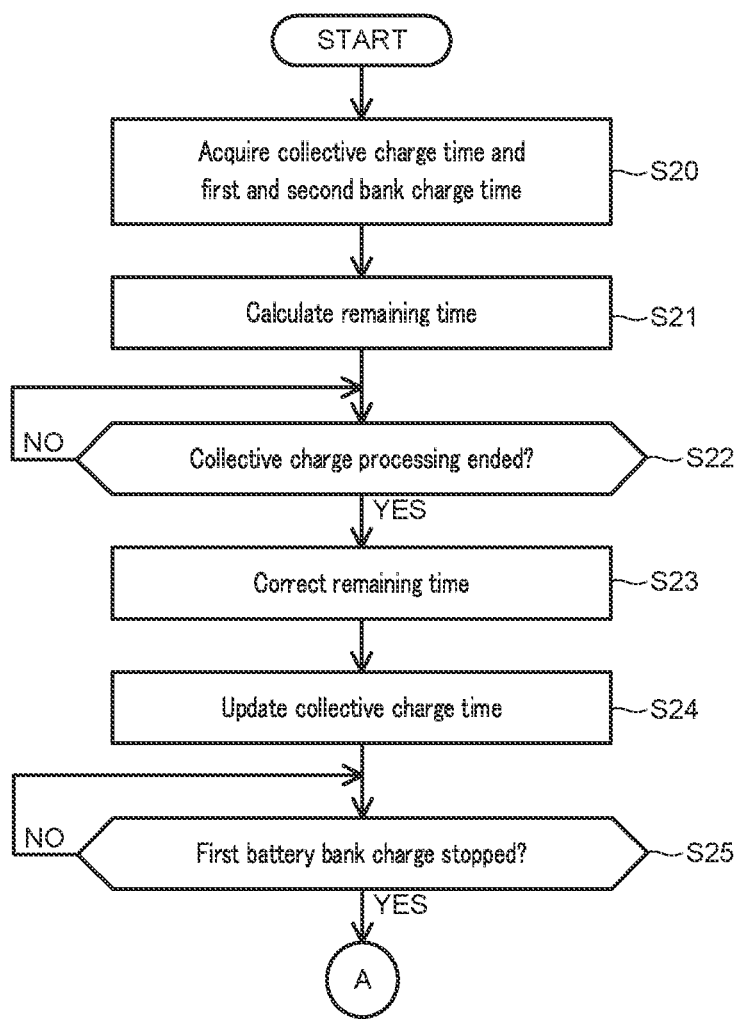
FIG. 6A is a flowchart illustrating a procedure performed by the control apparatus to calculate remaining time.

When starting the control for calculating the remaining time, control apparatus 50 performs S20 to S25 in FIG. 6A as in the above Embodiment 1. When the charge of first battery bank 20 is stopped (YES in S25), control apparatus 50 calculates, in S126 of FIG. 7A, a first actual drop amount that is the actual drop amount of the voltage value of first battery bank 20 per unit time at that time.

Then, in S127, control apparatus 50 determines whether the first actual drop amount is equal to or less than a first predetermined amount. The first predetermined amount is a value determined in advance by actual measurement through experiments or the like, and is determined to be the value of the first actual drop amount at point P in FIG. 5. That is, the first predetermined amount is the value of the first actual drop amount when the first actual drop amount becomes smaller and almost constant after the charge of first battery bank 20 is stopped.

When the temperature of first battery bank 20 is relatively high and the first actual drop amount is greater than the first predetermined amount (NO in S127), control apparatus 50 continues calculating the first actual drop amount (S126) and updating and indicating the remaining time. In contrast, when the voltage value of first battery bank 20 and the temperature of first battery bank 20 decrease and the first actual drop amount becomes equal to or less than the first predetermined amount (YES in S127), control apparatus 50 corrects the remaining time in S128.

To be more specific, control apparatus 50 calculates another first charge stop time, which is the time required from when the first actual drop amount becomes equal to or less than the first predetermined amount to when the second bank charge processing is started, and corrects the remaining time based on the calculated another first charge stop time.

Control apparatus 50 calculates the another first charge stop time by subtracting the power source voltage value from the voltage value of first battery bank 20 at the time when the first actual drop amount becomes equal to or less than the first predetermined amount, and dividing the subtracted value by the first actual drop amount at the time when the first actual drop amount becomes equal to or less than the first predetermined amount.

Further, control apparatus 50 corrects the remaining time by replacing the remaining time at the time when the first actual drop amount becomes equal to or less than the first predetermined amount with the sum of the calculated another first charge stop time and the second bank charge time acquired in S20. After the first actual drop amount becomes equal to or less than the first predetermined amount, control apparatus 50 subtracts the time elapsed from when the first actual drop amount becomes equal to or less than the first predetermined amount from the corrected remaining time at predetermined time intervals to calculate the remaining time at that time and update the remaining time to the latest. Control apparatus 50 then indicates the updated remaining time to load apparatus 3.

Subsequently, control apparatus 50 performs S129 to S131 as in S29 to S31 in Embodiment 1.

When the charge of second battery bank 30 is stopped (YES in S131), in S132, control apparatus 50 calculates a second actual drop amount that is the actual drop amount of the voltage value of second battery bank 30 per unit time at that time.

Then, in S133, control apparatus 50 determines whether the second actual drop amount is equal to or less than a second predetermined amount. The second predetermined amount is a value determined in advance by actual measurement through experiments or the like, and is determined to be the value of the second actual drop amount at point Q in FIG. 5. That is, the second predetermined amount is the value of the second actual drop amount when the second actual drop amount becomes smaller and almost constant after the charge of second battery bank 30 is stopped. Note that the second predetermined amount may be the same as the first predetermined amount in a case where the configurations of first and second battery banks 20 and 30 are similar to each other.

When the temperature of second battery bank 30 is relatively high and the second actual drop amount is greater than the second predetermined amount (NO in S133), control apparatus 50 continues calculating the second actual drop amount (S132) and updating and indicating the remaining time. In contrast, when the voltage value of second battery bank 30 and the temperature of second battery bank 30 decrease and the second actual drop amount becomes equal to or less than the second predetermined amount (YES in S133), control apparatus 50 corrects the remaining time in S134.

To be more specific, control apparatus 50 calculates another second charge stop time, which is the time required from when the second actual drop amount becomes equal to or less than the second predetermined amount to when the second bank charge processing is ended, and corrects the remaining time based on the calculated another second charge stop time.

Control apparatus 50 calculates the another second charge stop time by subtracting the power source voltage value from the voltage value of second battery bank 30 at the time when the second actual drop amount becomes equal to or less than the second predetermined amount, and dividing the subtracted value by the second actual drop amount at the time when the second actual drop amount becomes equal to or less than the second predetermined amount.

Further, control apparatus 50 corrects the remaining time by replacing the remaining time at the time when the second actual drop amount becomes equal to or less than the second predetermined amount with the calculated another second charge stop time. After the second actual drop amount becomes equal to or less than the second predetermined amount, control apparatus 50 subtracts the time elapsed from when the second actual drop amount becomes equal to or less than the second predetermined amount from the corrected remaining time at predetermined time intervals to calculate the remaining time at that time and update the remaining time to the latest. Control apparatus 50 then indicates the updated remaining time to load apparatus 3.

Next, control apparatus 50 performs S135 and S136 as in S35 and S36 in Embodiment 1, and ends the control for calculating the remaining time.

The present disclosure is not limited to the embodiments described above. Various modifications to the embodiments and embodiments with components in different embodiments combined are also included within the scope of the present disclosure, as long as they do not depart from the spirit of the present disclosure.

For example, Expression 1 may be altered into the following Expression 2.

[2]

Remaining time at the start of charge=$Tm0 \times (100-So)/(100-\alpha)+Tm1+Tm2$       (Expression 2)

In Expression 2, So (%) is the SOC of battery bank unit 1 at the start of charge control (time t0). $\alpha$ (%) is the first predetermined charge rate and is the SOC of a battery bank unit at the start of an experiment to determine the total charge time to be stored in table T.

"Tm0" is multiplied by "$(100-So)/(100-\alpha)$" in Expression 2, which is a difference from Expression 1. As described above, Tm0 is the collective charge time, and corresponds to the time required from the start (time t0) to the end (time t1) of collective charge processing in a case where the SOC of battery bank unit 1 at the start of charge is the first predetermined charge rate ($\alpha$).

"$(100-So)/(100-\alpha)$" is a ratio of the amount of charge for the SOC of battery bank unit 1 to be 100% from So to the amount of charge for the SOC of battery bank unit 1 to be 100% from $\alpha$.

Thus, "$Tm0 \times (100-So)/(100-\alpha)$" in Expression 2 corresponds to the time required from the start (time t0) to the end (time t1) of collective charge processing in a case where the SOC of battery bank unit 1 at the start of collective charge is So.

That is, Expression 2 makes it possible to calculate the remaining time at the start of charge excluding the time required for charging the charge amount corresponding to the SOC of battery bank unit 1 at the start of collective charge. Control apparatus 50 calculates the remaining time to complete the charge of battery bank unit 1 based on the temperature of battery bank unit 1 and the SOC of battery bank unit 1 at the start of collective charge processing. Thus, control apparatus 50 can accurately calculate the remaining time at the start of charge.

Control apparatus 50 may start the charge control in a case where the SOC of battery bank unit 1 decreases due to self-discharge of first and second battery banks 20 and 30 and becomes equal to or lower than a second predetermined charge rate (e.g., 90%). The second predetermined charge rate is determined so that the SOC of battery bank unit 1 is not relatively low due to self-discharge. Note that the second predetermined charge rate may be determined to be equal to the first predetermined charge rate. In this case, Tm0 (collective charge time) in Expressions 1 and 2 is determined based on the second predetermined charge rate, and is relatively highly accurate in a case where the SOC of battery bank unit 1 at the start of charge control is equal to the second predetermined charge rate. Thus, control apparatus 50 can calculate the remaining time more accurately in the case where the SOC of battery bank unit 1 at the start of charge control is equal to the second predetermined charge rate.

Further, control apparatus 50 may correct the remaining time in S30 based on the corrected charge time obtained by adding, to the actual first bank charge time, the charge time corresponding to the drop amount of the voltage value dropped due to self-discharge of second battery bank 30 during the first bank charge processing. Specifically, control apparatus 50 calculates the corrected charge time by multiplying the actual first bank charge time by a predetermined factor (e.g., 1.05). The predetermined factor is determined in advance by experimentally measuring the drop amount of the voltage value dropped due to self-discharge of second battery bank 30 during the first bank charge processing. Control apparatus 50 corrects the remaining time at time t3 (at the start of the second bank charge processing) by replacing it with the corrected charge time.

The configuration of first and second battery banks 20 and 30 may be different from each other. In this case, in table T, the temperature, collective charge time, first bank charge time, second bank charge time, voltage drop amount, and second voltage drop amount, which is the drop amount of the voltage value of second battery bank 30 per unit time after second battery bank 30 is fully charged, may be associated with each other. In this case, control apparatus 50 acquires the second voltage drop amount in S33.

Figure 6B:
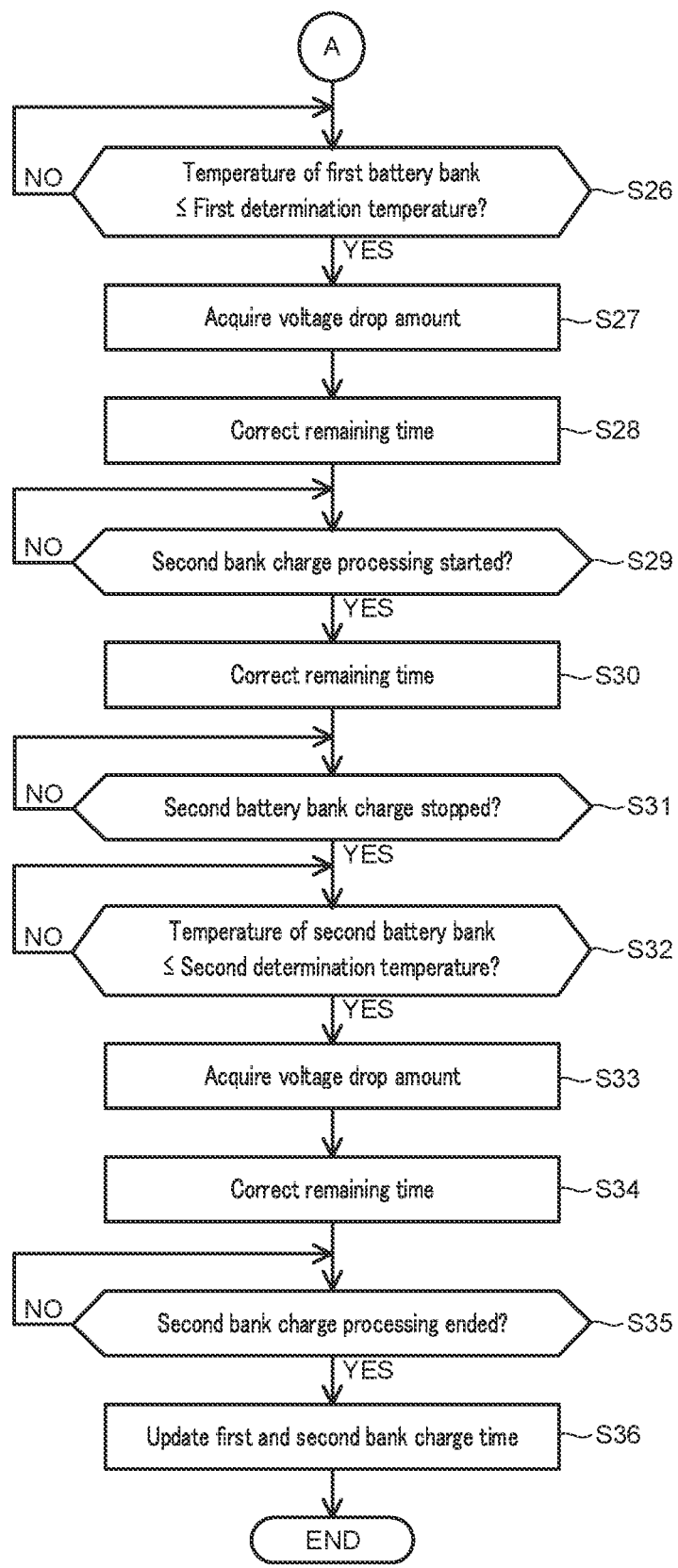
FIG. 6B is a flowchart following the procedure in FIG. 6A.
Figure 7A:
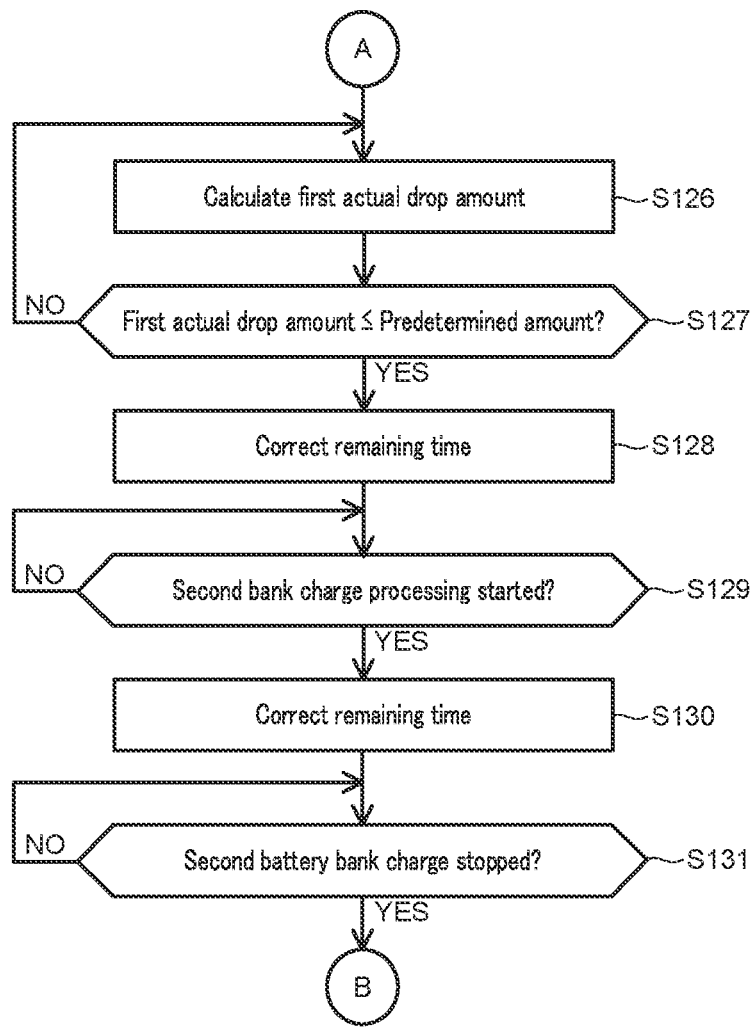
FIG. 7A is a flowchart illustrating a procedure performed by the control apparatus to calculate remaining time according to Embodiment 2 of the present disclosure.
Figure 7B:
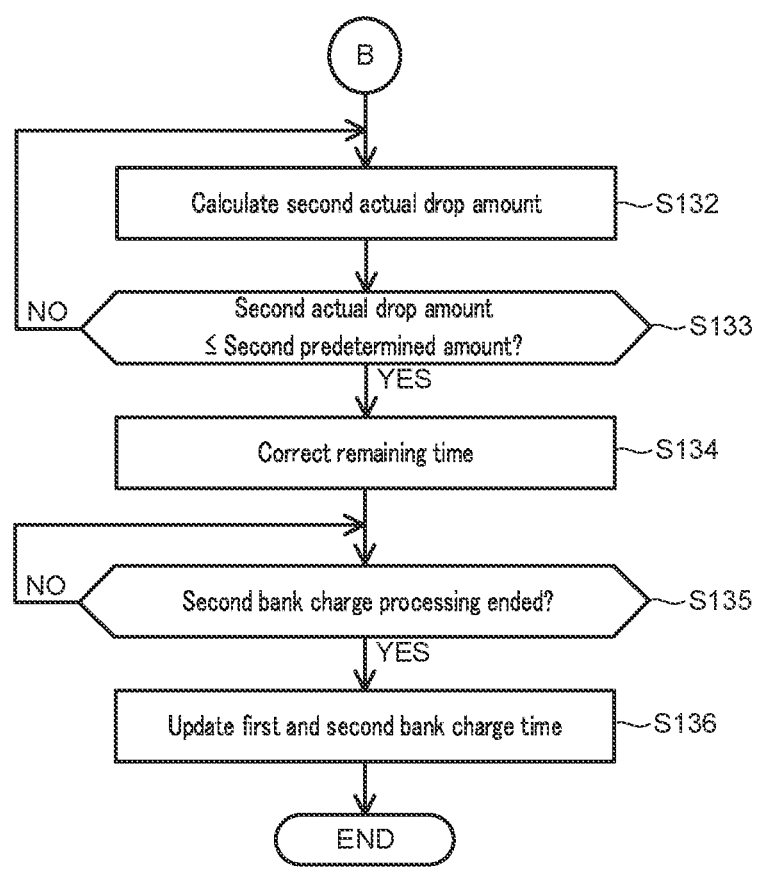
FIG. 7B is a flowchart following the procedure in FIG. 7A.

In the case where the configuration of first and second battery banks 20 and 30 are different from each other, the remaining time may not be corrected at the start of the second bank charge processing, that is, S30 in FIG. 6B and S130 in FIG. 7A may not be performed.

Battery bank unit 1 may be configured so that first and second battery banks 20 and 30 are removable. In addition, battery bank unit 1 need not include first and second battery banks 20 and 30 as the components of battery bank unit 1 itself. That is, battery bank unit 1 may be configured by including input/output terminal 10, charge/discharge circuitry 40, control apparatus 50, and sensors 60 to 64. In this case, battery bank unit 1 can function as a back-up apparatus for external power source 2 by retrofitting separately arranged first and second battery banks 20 and 30.

Further, storage 51 may be configured separately from control apparatus 50 and communicable with control apparatus 50. In this case, storage 51 may be communicably connected to control apparatus 50 via a network such as the Internet. With such a configuration, the information of the table can be shared by a plurality of battery bank units 1; furthermore, the table can be updated by the plurality of battery bank units 1 so as to store more accurate information. Also, control apparatus 50 may be configured separately from battery bank unit 1. In this case, control apparatus 50 can remotely control battery bank unit 1 and calculate the remaining time via a network such as the Internet. Further, storage 51 may be a non-transitory storage medium that stores a remaining charge time calculation program for calculating the remaining time, and control apparatus 50 may calculate the remaining time as described above by reading and executing the remaining charge time calculation program.

INDUSTRIAL APPLICABILITY

The present disclosure is particularly useful as a battery bank unit.

REFERENCE SIGNS LIST

1 Battery bank unit
20 First battery bank
30 Second battery bank
50 Control apparatus
T Table

What is claimed is:

1. A remaining charge time calculation method of a battery bank unit, the battery bank unit being connected in parallel with a load apparatus to a power line that supplies power from an external power source to the load apparatus and supplies power to the load apparatus when the external power source loses power, the battery bank unit including a first battery bank and a second battery bank connected in parallel to an input/output terminal thereof,
   wherein the battery bank unit is charged by:
      a collective charging of collectively charging the first battery bank and the second battery bank until their voltage values reach a power supply voltage value;
      a first bank charging of charging only the first battery bank after the collective charging, and when the first battery bank is fully charged, of stopping charging the first battery bank and waiting until the voltage value of the first battery bank drops to the power supply voltage value; and
      a second bank charging of charging only the second battery bank after the first bank charge, and when the second battery bank is fully charged, of stopping charging the second battery bank and waiting until the voltage value of the second battery bank drops to the power supply voltage value; and
   wherein the remaining charge time calculation method includes:
      a first process of calculating remaining time to complete charge of the battery bank unit based on a temperature of the battery bank unit at a start of the collective charging; and
      a second process of correcting the remaining time based on the behavior of the temperature and/or voltage values actually detected in the first battery bank and/or the second battery bank while charging of the battery bank unit is being performed.

2. A non transitory recording medium storing a computer readable program storing therein for calculating a remaining charge time of a battery bank unit, the battery bank unit being connected in parallel with a load apparatus to a power line that supplies power from an external power source to the load apparatus and supplies power to the load apparatus when the external power source loses power, the battery bank unit including a first battery bank and a second battery bank connected in parallel to an input/output terminal thereof,
   the battery bank unit is charged by:
      a collective charging of collectively charging the first battery bank and the second battery bank until their voltage values reach the power supply voltage value;
      a first bank charging of charging only the first battery bank after the collective charging, and when the first battery bank is fully charged, of stopping charging the first battery bank and waiting until the voltage value of the first battery bank drops to the power supply voltage value; and
      a second bank charging of charging only the second battery bank after the first bank charge, and when the second battery bank is fully charged, of stopping charging the second battery bank and waiting until the voltage value of the second battery bank drops to the power supply voltage value;
   and
   wherein the computer readable program includes:
      a first process of calculating remaining time to complete charge of the battery bank unit based on a temperature of the battery bank unit at a start of the collective charging; and
      a second process of correcting the remaining time based on the behavior of the temperature and/or voltage values actually detected in the first battery bank and/or the second battery bank while charging of the battery bank unit is being performed.

3. A battery bank unit that is connected in parallel to a load apparatus on a power line, the power line supplying power from an external power source to the load apparatus, and that supplies power to the load apparatus when the external power source loses power, the battery bank unit, comprising:
   an input/output terminal connected to the power line;
   a first battery bank and a second battery bank that are connected in parallel to the input/output terminal;
   a charge/discharge circuit that charges the first battery bank and/or the second battery bank from the external power source and discharges from the first battery bank and/or the second battery bank to the load apparatus; and
   a control apparatus that controls the charge/discharge circuit;
   wherein the control apparatus is configured to, when charging the battery bank unit, sequentially perform the following:
      a collective charging of collectively charging the first battery bank and the second battery bank until their voltage values reach the power supply voltage value;
      a first bank charging of charging only the first battery bank after the collective charging, and when the first battery bank is fully charged, of stopping charging the first battery bank and waiting until the voltage value of the first battery bank drops to the power supply voltage value; and
      a second bank charging of charging only the second battery bank after the first bank charging, and when the second battery bank is fully charged, of stopping charging the second battery bank and waiting until the voltage value of the second battery bank drops to the power supply voltage value; and
   wherein the control apparatus calculates remaining time to complete charge of the battery bank unit based on a temperature of the battery bank unit at a start of the collective charging: and corrects the remaining time based on the behavior of the temperature and/or voltage values actually detected in the first battery bank and/or the second battery bank while charging of the battery bank unit is being performed.

4. The battery bank unit according to claim 3,
   wherein; the control apparatus is configured to acquire information from a table in which a temperature, collective charge time, first bank charge time, and second bank charge time are associated with each other, the collective charge time being time required for the collective charging, the first bank charge time being time required from a start of the first bank charging to a start of the second bank charging, the second bank charge time being time required from the start of the second bank charging to completion of the charge of the battery bank unit, and wherein the control apparatus is configured to specify the collective charge time, the first bank charge time, and the second bank charge time from the table based on the temperature of the battery bank unit at the start of the collective charging, and calculates the remaining time by adding the specified collective charge time, the specified first bank charge time, and the specified second bank charge time.

5. The battery bank unit according to claim 4, wherein the control apparatus updates the table based on actual collective charge time, actual first bank charge time, and actual second bank charge time, the actual collective charge time being time actually spent from the start of the collective charging to the start of the first bank charging, the actual first bank charge time being time actually spent from the start of the first bank charging to the start of the second bank charging, the actual second bank charge time being time actually spent from the start of the second bank charging to the completion of the charge of the battery bank unit.

6. The battery bank unit according to claim 5, wherein the control apparatus corrects the remaining time during the charge of the battery bank unit based on at least one of the actual collective charge time and/or the actual first bank charge time.

7. The battery bank unit according to claim 4,
wherein the table stores a voltage drop amount in association with the temperature, the voltage drop amount being an amount of voltage drop per unit time while charge of the first battery bank is stopped, and
wherein the control apparatus, during the first bank charging:
detects the temperature of the first battery bank while charging of the first battery bank is stopped, and when a temperature of the first battery bank becomes equal to or lower than a predetermined determination temperature (first time point), specifies the voltage drop amount associated with the temperature at the first time point;
calculates a first charging stop time by subtracting the power supply voltage value from the voltage value of the first battery bank at the first time point and dividing the subtracted value by the voltage drop amount, the first charging stop time being the time required from the first time point to the start of the second bank charging; and
corrects the remaining time at the first time point to a value obtained by adding the first charging stop time and the specified second bank charging time.

8. The battery bank unit according to claim 7, wherein the control apparatus, during the second bank charging,
detects the temperature of the second battery bank while charging of the second battery bank is stopped, and when a temperature of the second battery bank becomes equal to or lower than a predetermined determination temperature (referred to as the "third time point"), specifies the voltage drop amount associated with the temperature at the third time point;
calculates a third charging stop time by subtracting the power supply voltage value from the voltage value of the second battery bank at the third time point and dividing the subtracted value by the voltage drop amount, the third charging stop time being the time required from the third time point to the end of the second bank charging; and
corrects the remaining time at the third time point to a value of the third charging stop time.

9. The battery bank unit according to claim 4, wherein the control apparatus, during the first bank charging,
calculates a first actual drop amount per unit time of a voltage value of the first battery bank while the charge of the first battery bank is stopped;
when the first actual drop amount becomes equal to or less than a predetermined amount (second time point), calculates a second charge stop time by subtracting the power supply voltage value from the voltage value of the first battery bank at the second time point and dividing the subtracted value by the first actual drop amount, the second charge stop time being a time required from the second time point to the start of the second bank charging; and
corrects the remaining time at the second time point to a value obtained by adding the second charging stop time and the specified second bank charging time.

10. The battery bank unit according to claim 9,
wherein the control apparatus, during the second bank charging, calculates a second actual drop amount per unit time of a voltage value of the second battery bank while the charge of the second battery bank is stopped in the second bank charging;
when the second actual drop amount becomes equal to or less than a predetermined amount (referred to as the "forth time point"), calculates a forth charge stop time by subtracting the power supply voltage value from the voltage value of the second battery bank at the forth time point and dividing the subtracted value by the second actual drop amount, the forth charge stop time being a time required from the forth time point to the end of the second bank charging; and
corrects the remaining time at the forth time point to a value of the forth charging stop time.

* * * * *